US009224227B2

(12) United States Patent
Meixner

(10) Patent No.: US 9,224,227 B2
(45) Date of Patent: Dec. 29, 2015

(54) TILE SHADER FOR SCREEN SPACE, A METHOD OF RENDERING AND A GRAPHICS PROCESSING UNIT EMPLOYING THE TILE SHADER

(71) Applicant: Nvidia, Santa Clara, CA (US)

(72) Inventor: Albert Meixner, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 266 days.

(21) Appl. No.: 13/724,354

(22) Filed: Dec. 21, 2012

(65) Prior Publication Data

US 2014/0176529 A1   Jun. 26, 2014

(51) Int. Cl.
*G06T 11/40* (2006.01)
*G06T 15/00* (2011.01)

(52) U.S. Cl.
CPC ............... *G06T 11/40* (2013.01); *G06T 15/005* (2013.01)

(58) Field of Classification Search
CPC .......................... G06T 15/80; G09G 2360/122
USPC ......................................................... 345/506
See application file for complete search history.

(56) References Cited

U.S. PATENT DOCUMENTS

| 6,226,012 | B1 * | 5/2001 | Priem et al. | 345/606 |
|---|---|---|---|---|
| 6,664,963 | B1 * | 12/2003 | Zatz | 345/426 |
| 7,505,036 | B1 * | 3/2009 | Baldwin | 345/421 |
| 7,564,456 | B1 * | 7/2009 | Lindholm et al. | 345/426 |
| 7,583,268 | B2 * | 9/2009 | Huang et al. | 345/506 |
| 7,692,659 | B1 * | 4/2010 | Molnar et al. | 345/501 |
| 8,228,328 | B1 * | 7/2012 | French et al. | 345/421 |
| 2005/0134588 | A1 * | 6/2005 | Aila et al. | 345/426 |
| 2008/0189524 | A1 * | 8/2008 | Poon et al. | 712/221 |
| 2011/0081100 | A1 * | 4/2011 | Lindholm et al. | 382/300 |
| 2012/0069021 | A1 * | 3/2012 | Son et al. | 345/426 |
| 2013/0321590 | A1 * | 12/2013 | Kirk | 348/48 |

OTHER PUBLICATIONS

Silpa et al. "Rank based dynamic voltage and frequency scaling for tiled graphics processors", Proceeding CODES/ISSS '10 Proceedings of the eighth IEEE/ACM/IFIP international conference on Hardware/software codesign and system synthesis pp. 3-12 ACM New York, NY, USA © 2010.*
Samanta et al. "Parallel rendering with k-way replication", Proceeding PVG '01 Proceedings of the IEEE 2001 symposium on parallel and large-data visualization and graphics, pp. 75-84, IEEE Press Piscataway, NJ, USA © 2001.*

* cited by examiner

*Primary Examiner* — Maurice L McDowell, Jr.

(57) ABSTRACT

A tile shader for screen space of a graphics pipeline, a method of rendering graphics and a graphics processing unit are disclosed. In one embodiment, the tile shader includes: (1) an input interface configured to receive a tile of pixels for processing and (2) a tile processor configured to perform tile-level processing of the pixels.

17 Claims, 3 Drawing Sheets

TILE SHADER FOR SCREEN SPACE, A METHOD OF RENDERING AND A GRAPHICS PROCESSING UNIT EMPLOYING THE TILE SHADER

TECHNICAL FIELD

This application is directed, in general, to graphics processing units (GPUs) and, more specifically, to rendering in graphic pipelines of a GPU.

BACKGROUND

GPUs advantageously use parallel processing to efficiently perform select operations. Rendering is an example of such an operation. Rendering is the process of extracting data from world space and rendering it into a screen space. World space is three-dimensional space that is often generated from a program run on a CPU. A GPU receives instructions from the CPU program, generates the three-dimensional world space based thereon and renders a two-dimensional view for a display (i.e., screen space) from the world space. For example, the CPU program can be a video game that sends instructions to the GPU for rendering a two-dimensional view onto a display.

A GPU uses a graphics pipeline for the rendering process. Traditional graphics pipelines include fixed function units. In some conventional GPUs, programmable function stages are solely used to form a graphics pipeline or are connected with fixed function units to form a graphics pipeline. Regardless of the type of graphics pipeline, each stage modifies the input data and passes the modified data to the next stage of the pipeline for further modification to generate a view for the screen space.

Since a display view is usually a two-dimensional view, the rendering process considers depth and what a user would actually see on the display, i.e., the user's view. Ztest is a function in graphics pipelines that is used to insure what a user sees on a display are the particular objects that are supposed to be seen. Ztest is used early and late, early-Z and late-Z, in the rendering process to determine if what is currently be drawn is either in front of or behind of what is already viewable on a display in screen space.

SUMMARY

In one aspect, the disclosure provides a tile shader for screen space of a graphics pipeline. In one embodiment, the tile shader includes: (1) an input interface configured to receive a tile of pixels for processing and (2) a tile processor configured to perform tile-level processing of the pixels.

In another aspect, a method of rendering in a graphics pipeline is disclosed. In one embodiment, the method includes: (1) receiving tiles of pixels for a screen space, wherein the pixels were generated from a world space and (2) processing the tiles of the pixels for the screen space.

In yet another aspect, a graphics processing unit is disclosed. In one embodiment, the graphics processing unit includes: (1) world space configured to generate screen space geometry data from three dimensional geometry data and (2) screen space coupled to the world space and including a raster stage configured to generate pixels from the screen space geometry data and a tile stage configured to perform screen space processing of the pixels at a tile level.

BRIEF DESCRIPTION

Reference is now made to the following descriptions taken in conjunction with the accompanying drawings, in which.

DETAILED DESCRIPTION

Figure 1:
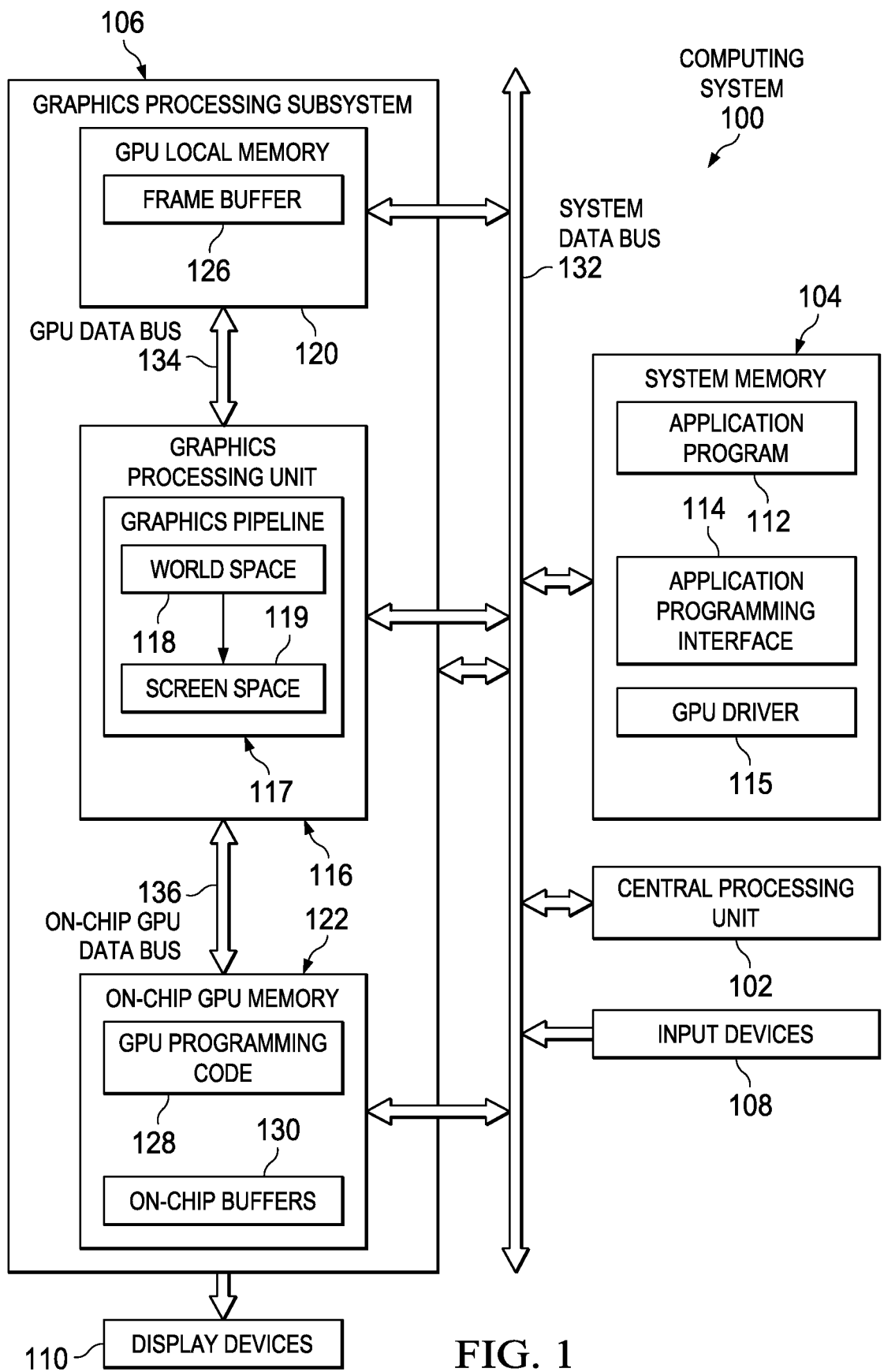
FIG. 1 is a block diagram of an embodiment of a computing system in which one or more aspects of the disclosure may be implemented.

Current graphics pipelines typically support up to four shading stages, either fixed function units or programmable shaders, in the world space, but only a single shading stage in screen space. The four world space shaders are, for example, a vertex shader, a hull shader, a domain shader and a geometry shader. The single screen space shader is a pixel shader. A pixel shader operates on every pixel covered by a particular object and returns the color of the pixel. Having just a shader stage that operates on individual pixels in the screen space of a graphics pipeline makes it difficult to efficiently perform operations on larger screen regions.

The disclosure therefore provides an additional shader stage for screen space. The additional shader stage, referred to herein as a tile shader, provides coarse screen-space processing in a graphics pipeline by operating on tiles of pixels instead of individual pixels. A tile is a group or an array of pixels. In one embodiment, a tile is an eight by eight (8×8) contiguous block of pixels. Thus, the tile shader advantageously performs pixel processing at a tile level instead of just at the individual pixel level. As such, a programmable tile shader can advantageously implement algorithms that perform screen-space processing on larger screen regions instead of on individual pixels. Screen-space processing is processing performed during the two-dimensional processing portion of a graphics pipeline. In contrast to traditional graphics pipelines that perform screen-space processing only on individual pixels, the disclosure provides coarse screen-space processing or screen-space processing at a tile-level in addition to processing at pixel-level.

In one embodiment illustrated herein, the tile shader is the first shader stage or programmable shader stage in the screen space of a graphics pipeline. Other fixed function stages, such as raster and ZTest can precede the tile shader. The screen space or the screen space section is that portion or stages of a graphics pipeline that performs two-dimensional operations, such as rasterization and per-pixel lighting. As defined herein, a raster stage is considered the first stage of the screen space of a graphics pipeline. Similarly, world space or the world space section is that portion of a graphics pipeline that performs three-dimensional operations, such as object transformations and projection. In one embodiment, the tile shader is placed in the graphics pipeline between a depth-test or Ztest and the pixel shader (for early-Z) and between rasterization and pixel shader (for late-Z). In both late-Z and early-Z, the pixel shader can be by-passed for a Z-only mode.

In contrast to conventional screen spaces that just include a pixel shader, the disclosed screen space that includes a tile shader can assist in reducing pipeline computations. This can be seen when examining the operation of a GPU. A GPU can be fast and efficient based on the assumption that the same instructions can be executed for a large number of pixels at same time. This assumed the same steps of the program are followed for each of the pixels. If not, the operating speed of the GPU is reduced.

The pixel kill option, however, kills pixel that do not need rendering. Killed pixels are not replaced by drawn pixels but are just dead. Thus, the advantage of parallel processing is lost since there is an empty slot in GPU and the full compute power cannot be used.

With the tile shader, a larger set of pixels can be examined and a determination made of what pixels will be killed and then killed at that point. As such, the tile shader can then launch only those pixels to the pixel shader that will actually execute the whole program. The pixel shader can then more efficiently render since all pixels that are operated on by the pixel shader will actually generate results and will not get lost later.

The disclosed graphics pipeline can advantageously send all data through at one time to the tile shader for a coarse understanding of z-axis issues. This then allows the tile shader to create a subset of pixels that actually need further processing. This pixel subset can then be reissued or launched by the tile shader for pixel processing. Thus, in one embodiment the tile shader determines beforehand a subset of pixels that will need processing to prevent unnecessary work at the pixel stage and reduce computations in the graphics pipeline. This can prove beneficial since determining pixel color in a pixel shader is usually the most expensive mode of the rendering operations.

Before describing various embodiments of the novel graphics pipeline, tile shader and methods of operating associated therewith, a computing system within which each of these may be embodied or employed will be described.

FIG. 1 is a block diagram of one embodiment of a computing system 100 in which one or more aspects of the invention may be implemented. The computing system 100 includes a system data bus 132, a central CPU 102, input devices 108, a system memory 104, a graphics processing subsystem 106, and display devices 110. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special purpose processing unit or co-processor.

As shown, the system data bus 132 connects the CPU 102, the input devices 108, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104 and sends instructions and/or data (i.e., work or tasks to complete) to a graphics processing unit 116 to complete. The system memory 104 typically includes dynamic random access memory (DRAM) used to store programming instructions and data for processing by the CPU 102 and the graphics processing subsystem 106. The graphics processing subsystem 106 receives the transmitted work from the CPU 102 and processes the work employing a graphics processing unit (GPU) 116 thereof. In this embodiment, the GPU 116 completes the work in order to render and display graphics images on the display devices 110. In other embodiments, the GPU 116 or the graphics processing subsystem 106 as a whole can be used for non-graphics processing.

As also shown, the system memory 104 includes an application program 112, an application programming interface (API) 114, and a graphics processing unit (GPU) driver 115. The application program 112 generates calls to the API 114 in order to produce a desired set of results, typically in the form of a sequence of graphics images.

The graphics processing subsystem 106 includes the GPU 116, an on-chip GPU memory 122, an on-chip GPU data bus 136, a GPU local memory 120, and a GPU data bus 134. The GPU 116 is configured to communicate with the on-chip GPU memory 122 via the on-chip GPU data bus 136 and with the GPU local memory 120 via the GPU data bus 134. The GPU 116 may receive instructions transmitted by the CPU 102, process the instructions in order to render graphics data and images, and store these images in the GPU local memory 120. Subsequently, the GPU 116 may display certain graphics images stored in the GPU local memory 120 on the display devices 110.

The GPU 116 includes a graphics pipeline 117 that is configured to render a two-dimensional view in screen space. The graphics pipeline 117 includes world space 118 and screen space 119. In one embodiment, the world space 118 includes four shading stages: a vertex shader, a hull shader, a domain shader and a geometry shader. In FIG. 1, each of the world space stages 118 is a programmable shader stage. In other embodiments, at least one of the world space stages 118 is a fixed function stage. A fixed function stage or fixed function unit has circuitry configured to perform a dedicated function. A programmable processing stage or unit includes the necessary processors and memory to perform dedicated functions of a pipeline stage. In one embodiment, the processors can be specifically configured for processing highly parallel code. In other embodiments, general processing units with scalar cores can be implemented as programmable stages. The shader stages of the world space stages can be conventional components of a graphics pipeline.

The screen space 119 includes a tile shader and a pixel shader. Thus, in contrast to conventional graphics pipeline, the graphics pipeline 116 includes a tile shader in addition to a pixel shader. Instead of processing individual pixels, the tile shader operates on tiles of pixels. More detail of a screen space portion of a graphics pipeline is illustrated and discussed with respect to FIG. 2 and FIG. 3.

One skilled in the art will understand that the graphic pipeline 116 can include additional components that are typically included in a graphics pipeline. For example, the screen space 119 can include a raster stage, a Ztest stage and a composition stage. The GPU 116 may be provided with any amount of on-chip GPU memory 122 and GPU local memory 120, including none, and may use on-chip GPU memory 122, GPU local memory 120, and system memory 104 in any combination for memory operations.

The on-chip GPU memory 122 is configured to include GPU programming code 128 and on-chip buffers 130. The GPU programming 128 may be transmitted from the GPU driver 115 to the on-chip GPU memory 122 via the system data bus 132.

The GPU local memory 120 typically includes less expensive off-chip dynamic random access memory (DRAM) and is also used to store data and programming used by the GPU 116. As shown, the GPU local memory 120 includes a frame buffer 126. The frame buffer 126 stores data for at least one two-dimensional surface that may be used to drive the display devices 110. Furthermore, the frame buffer 126 may include more than one two-dimensional surface so that the GPU 116 can render to one two-dimensional surface while a second two-dimensional surface is used to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

Having described a computing system within which the disclosed tile shader and methods may be embodied or carried out, particular embodiments of graphics pipelines will be described in FIG. 2 and FIG. 3.

Figure 2:
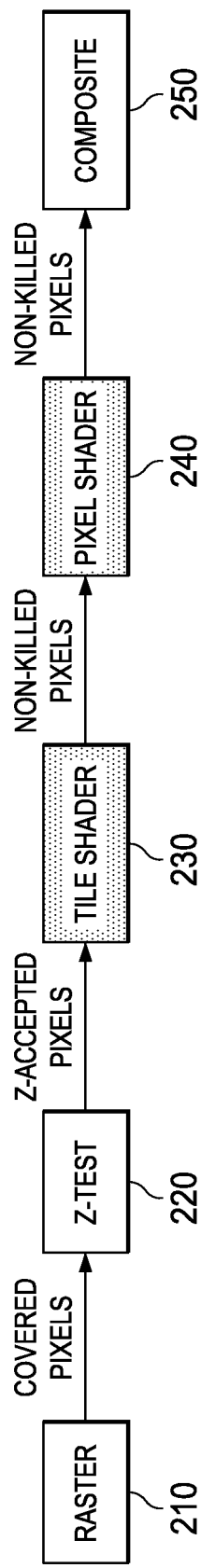
FIG. 2 illustrates a block diagram of an embodiment of a screen space section of a graphics pipeline constructed according to the principles of the disclosure.

FIG. 2 illustrates a block diagram of an embodiment of a screen space section 200 of a graphics pipeline constructed according to the principles of the disclosure. The screen space section 200 is of an early-Z graphics pipeline. The screen space section 200 includes a raster stage 210, a Z-test stage 220, a tile shader 230, a pixel shader 240 and a composite stage 250.

The raster stage 210 converts vector information composed of shapes or primitives into a raster image composed of pixels to provide a two-dimensional view for a display. The raster stage 210 typically generates covered pixels for further processing by the screen view. A covered pixel is a pixel that is covered by an object and needs coloring.

The Z-test stage 220 receives the covered pixels from the raster stage 210 and performs a depth test to determine which pixels will actually be viewed in the two-dimensional space. As such, the Z-test stage 220 generates Z-accepted pixels for further processing.

The tile shader 230 receives the Z-accepted pixels from the Z-test stage 220 and performs screen space processing on the pixels at a tile-level. As such, the tile shader 230 advantageously processes multiple pixels together instead of operating on individual pixels. In one embodiment, the screen space processing includes coverage computations, redefining output positions, multi-layer rendering, and variable resolution rendering. Additionally, in some embodiments, the tile shader 230 is configured to determine a subset of the received pixels for further processing by the pixel shader 240. In one embodiment, the pixel subset is of non-killed pixels. After operating on the pixels at a tile-level, the tile shader 230 launches the pixels to the pixel shader 240.

The pixel shader 240 receives the pixels from the tile shader 230. As illustrated in FIG. 2, the received pixels can be non-killed pixels. As such, the pixel shader can efficiently operate on all of the received pixels. The pixel shader 240 determines the color for the received pixels and launches the colorized pixels to the composite stage 250.

The composite stage 250 receives the colorized pixels from the pixel shader 240 and composites the pixels to form a view that can be displayed via, for example, the display devices 110 of FIG. 1. In one embodiment, the raster stage 210, the Z-test stage 220, the pixel shader 240 and the composite stage 250 are conventional stages typically found in a graphics pipeline. In some embodiments, each of the stages of the screen space section 200 is a programmable stage.

Figure 3:
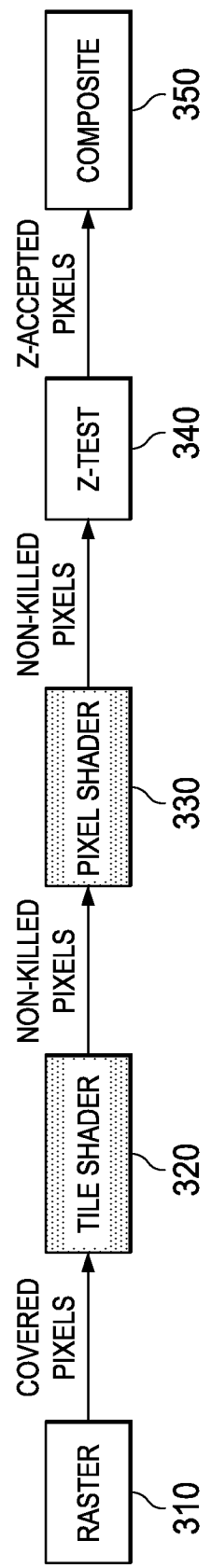
FIG. 3 illustrates a block diagram of another embodiment of a screen space section of a graphics pipeline constructed according to the principles of the disclosure.

FIG. 3 illustrates a block diagram of another embodiment of a screen space section 300 of a graphics pipeline constructed according to the principles of the disclosure. The screen space section 300 is of a late-Z graphics pipeline. The screen space section 300 includes a raster stage 310, a tile shader 320, a pixel shader 330, a Z-test stage 340 and a composite stage 350.

Each of the similarly named stages of the screen space section 300 operates as described above with respect to the screen space section 200. The difference is due to the order of the pipelines and, therefore, the pixels that are received.

Figure 4:
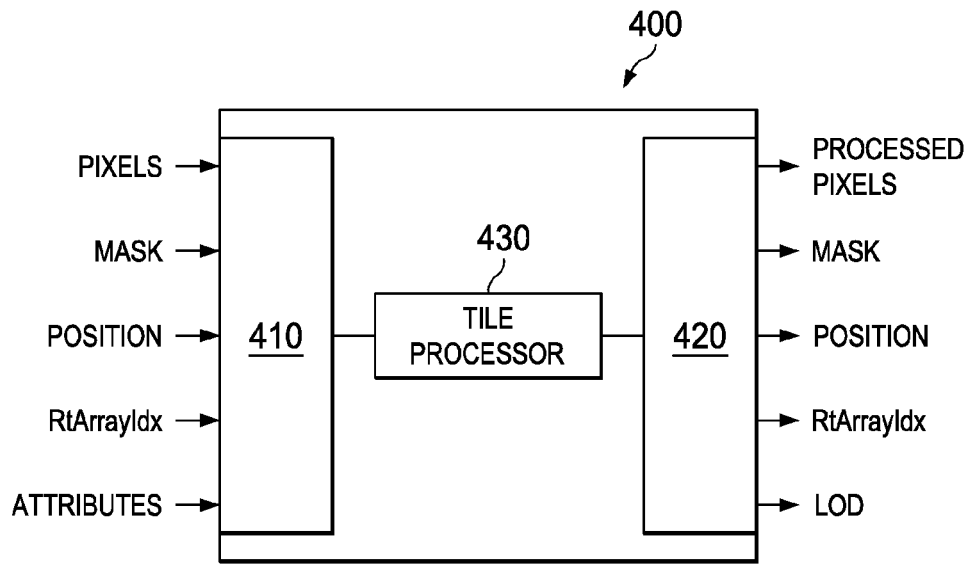
FIG. 4 illustrates a block diagram of an embodiment of a tile shader constructed according to the principles of the disclosure.

FIG. 4 illustrates a block diagram of an embodiment of a tile shader 400 constructed according to the principles of the disclosure. The tile shader 400 includes an input interface 410, an output interface 420, and a tile processor 430. The tile shader 400 is a programmable tile shader that is configured to operate on pixel tiles according to a series of operating instruction that reflect algorithms for performing screen-space operations on pixels at a tile level.

The input interface 410 is configured to receive pixels for processing. As indicated from FIG. 2 and FIG. 3, the pixels can be covered pixels or Z-accepted pixels depending on the placement of the tile shader 400 in the graphics pipeline. In one embodiment, the pixels are already formed into tiles when received. The interface 410 can be a conventional interface employed in programmable function units to communicate with other stages of a graphics pipeline and receive processing inputs to employ when processing the pixels.

The processing inputs noted in FIG. 4 are Mask, Position, RtArrayIdx and Attributes. Mask indicates the coverage mask for the fine raster transaction. Position indicates the position of the fine raster transaction. RtArrayIdx represents the render target array index. Attributes are the attributes of the primitives in a "Fine Raster" (FRSTR) transaction, wherein a Fine Raster transaction consists of 8×8 pixels from the same primitive. The Mask, Position, RtArrayIdx can be accessed by the tile shader 400 from the "Pixel Load" (PIXLD), which is an instruction specified in the DirectX API, and Attributes can be accessed from the "Interpolate Attribute" (IPA), which is also an instruction specified in the DirectX API.

The output interface 420 is configured to launch pixels for further processing by subsequent stages of a graphics pipeline. In multiple embodiments, the subsequent stage is a pixel shader. The output interface 420 can be a conventional interface employed in programmable function units to communicate with other stages of a graphics pipeline and provide processing outputs for other pipeline stages. The processing outputs can be placed in output registers as illustrated in FIG. 4. In FIG. 4, four output registers of the output interface 420 are specifically denoted, 422, 424, 426 and 428.

Similar to the processing inputs, the processing outputs are Mask, Position, RtArrayIdx and level-of-detail (LOD). Mask, Position and RtArrayIdx are as noted above with respect to the processing inputs. A zero ("0") value for Mask is defined to kill the fine raster transaction. LOD is used to indicate the level of detail for variable resolution rendering.

The tile processor 430 is configured to perform screen-space processing of the pixels at a tile-level. In one embodiment, the tile processor 430 is configured to determine a subset of pixels received for further processing along the graphics pipeline. In some embodiments, the tile processor 430 can be a custom processor that has been configured for parallel processing; such as a serial multiprocessor. In other embodiments, the tile processor 430 can be a scalar core.

In one embodiment, the tile processor 430 runs from 1 to N threads per fine raster transactions, wherein each warp thereof can process multiple fine raster transactions. The tile processor 430 can use texture instructions with LOD computations. In some embodiments, the LOD computations are implicit if at least four threads are running per tile. Otherwise, LODs have to be specified implicitly. The tile processor 430 can be configured to add appropriate LOD-bias to account for non-unit screen distance between threads being processed.

The tile processor 430 is configured to evaluate IPAs at the tile position for all threads. In one embodiment, the tile processor 430 is configured to appropriate per-thread offsets. In one embodiment, the tile shader 430, when altering the output of a tile, is configured to ensure that all writes to an output location are from the same input location (i.e., 1:n relationship between input positions and output positions) to guarantee that raster operator accesses to that tile occur in API order.

Following are examples how the tile shader 400 can be employed to improve the operation of a graphics pipeline. Other advantages not disclosed herein can also be obtained from the tile-level processing of the tile shader 400 in the screen space.

A first use example relates to Foliage, Stochastic Rasterization and Double-Sided Z. Regimes that currently kill a lot of pixels early in the pixel shader, such as foliage rendering and stochastic rasterization, currently suffer from low warp utilization and out of order completion in the pixel shader. In addition, the pixel shader may also be executed for Z-killed pixels, because depth test cannot often be done before the pixel shader.

If the coverage computations are performed in the tile shader 400 instead, a depth test can be performed before the pixel shader and the pixel shader is only executed for surviving pixels. This improves warp utilization and leads to more uniform execution times, hence reducing out-of-order completion. FIG. 2 and FIG. 3 illustrate on the labeled arrows how the tile shader 400 can be used to remove killed pixel from the pipeline before the pixel shader.

A second use example relates to Sparse Render Targets. The ability to change the output position can be used to render into a sparsely allocated render target. In one embodiment, the tile shader 400 is configured to use a software-defined map to locate a memory for the virtual tile coordinates. Unlike the virtual memory-based hardware scheme, this allows mapping to easily be changed on-the-fly since system-level access to redefine the mapping function is not required.

A third use example relates to Multi-Layer Rendering. Beyond sparse rendering, which maps each screen tile to 0 or 1 tiles in memory, the tile shader 400 can also be used to map the same screen coordinates to multiple different memory tiles. This allows the tile shader 400 to render multiple layers at the same location to support high quality anti-aliasing and order-independent transparency.

Another use example is Variable Resolution Rendering. As a further extension to the sparse rendering, the tile shader 400 can be used to render different tiles at different resolutions based on the content or position on the screen.

Figure 5:
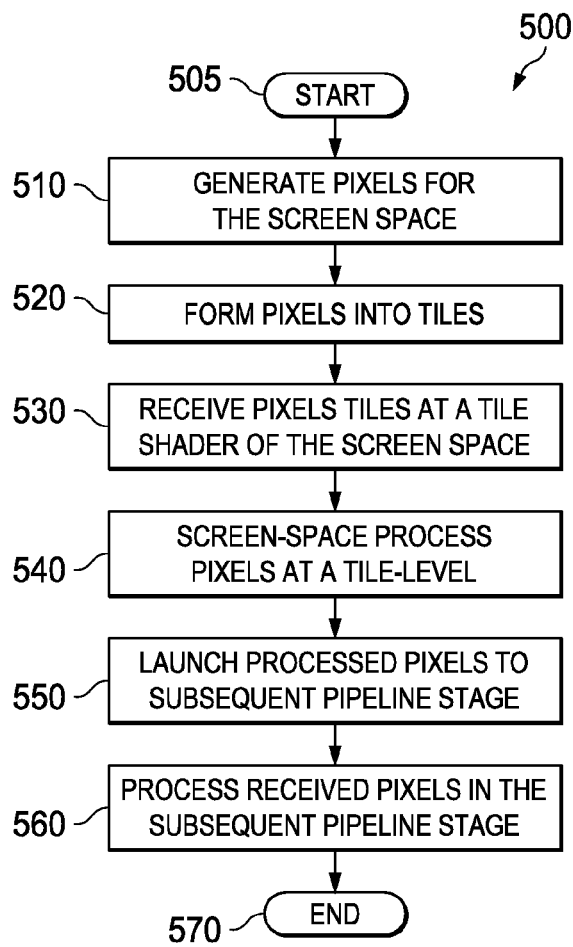
FIG. 5 illustrates a flow diagram of a method of rendering employing a graphics pipeline carried out according to the principles of the disclosure.

FIG. 5 illustrates a flow diagram of an embodiment of a method 500 of rendering in a graphics pipeline carried out according to the principles of the disclosure. The graphics pipeline includes world space and screen space that includes a tile shader. The method 500 begins in a step 505.

In a step 510, pixels are generated for the screen space. In one embodiment, a raster operator generates the pixels from the world space data. As shown in FIG. 2, in one embodiment, the generated pixels are covered pixels.

In a step 520, the pixels are formed into tiles. In one embodiment, an external processor to the tile shader forms the tiles and then delivers the tiles of pixels to the tile shader for processing.

The pixels are received by a tile shader of the graphics pipeline in a step 530. In one embodiment, the tile shader receives the pixels from the raster operator without an intervening processing stage of the graphics pipeline. In another embodiment, the tile shader receives the pixels from a Z-test stage after the raster stage.

The tiles of pixels are then screen-space processed in a step 540 by the tile shader. In one embodiment, the tile shader determines a subset of the pixels for further processing along the graphics pipeline. In one embodiment, the subset is non-killed pixels. In other embodiments, the screen-space processing includes coverage computations for the pixels, redefining output positions for the pixels, multi-layer rendering for the pixels, and variable resolution rendering for the pixels.

In a step 550, the pixels from the processed tiles are launched along the pipeline for the subsequent stage for further processing. In one embodiment, the pixels that are launched are the subset of pixels. The received pixels are then processed by the subsequent stage in a step 560. In one embodiment, the subsequent stage is a pixel shader of the graphics pipeline. In other embodiments, the subsequent stage is another stage of the graphics pipeline, e.g., a composite stage. The method 500 then ends in a step 570.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

The above-described apparatuses and methods or at least a portion thereof may be embodied in or performed by various, such as conventional, digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method, or functions of the apparatuses described herein, e.g., a tile shader. A programmable shader stage, such as the tile shader, can be implemented on a special purpose processor that is well suited for highly parallel code.

Certain embodiments of the invention further relate to computer storage products with a non-transitory computer-readable medium that have program code thereon for performing various computer-implemented operations that embody the apparatuses, the systems or carry out the steps of the methods set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A tile shader for processing in a screen space section of a graphics pipeline, comprising:

an input interface configured to receive pixels in said screen space section for processing; and a tile processor configured to perform screen space processing of said pixels at a tile level and determine a subset of said pixels based on said screen space processing for further processing at a pixel level by a pixel shader of said graphics pipeline, wherein said tile processor and said pixel shader are either a programmable processing stage or a fixed function stage of said screen space section of said graphics pipeline.

2. The tile shader as recited in claim 1 wherein said subset of said pixels are non-killed pixels.

3. The tile shader as recited in claim 1 wherein said pixels are received after processing from a raster operator of said graphics pipeline.

4. The tile shader as recited in claim 1 wherein said pixels are covered pixels.

5. The tile shader as recited in claim 1 wherein said pixels are Z-accepted pixels.

6. The tile shader as recited in claim 1 wherein said input interface is further configured to receive processing inputs for said pixels.

7. The tile shader as recited in claim 1 wherein said tile processor is further configured to generate processing outputs.

8. The tile shader as recited in claim 1 wherein said screen space processing at said tile-level includes at least one type of processing selected from the group consisting of:
coverage computations for said pixels,
redefining output positions for said pixels,
multi-layer rendering for said pixels, and
variable resolution rendering for said pixels.

9. A method of rendering in a graphics pipeline, comprising:
receiving tiles of pixels for a screen space, wherein said pixels were generated from a world space; and
processing said pixels of said tiles at a tile level for said screen space, wherein said receiving and said processing are performed by a processor in a screen space section of said graphics pipeline and said processing is performed after a raster stage of said graphics pipeline, and
determining, from said processing, a subset of said pixels for further processing at a pixel level by a pixel shader of said screen space section.

10. The method as recited in claim 9 wherein said pixels are covered pixels or Z-accepted pixels.

11. The method as recited in claim 9 wherein said subset of said pixels are non-killed pixels.

12. The method as recited in claim 9 wherein said processing includes employing texture instructions having a level-of-detail.

13. The method as recited in claim 9 wherein said processing includes evaluating interpolate attributes for tile positions of said tiles.

14. A graphics processing unit, comprising:
a world space section having at least one programmable processing stage or fixed function stage configured to generate screen space geometry data from three dimensional geometry data; and
a screen space section coupled to said world space section and including a raster stage configured to generate pixels from said screen space geometry data generated by said world space section, a tile stage configured to perform screen space processing of said pixels at a tile level and based thereon determine a subset of said pixels, a pixel stage that is configured to process said subset of said pixels after said tile stage and at a pixel level, wherein said raster stage, said tile stage and said pixel stage are either a programmable processing stage or a fixed function stage of said screen space section.

15. The graphics processing unit as recited in claim 14 further comprising a Z-test stage configured to process said pixels after said pixel stage, wherein said Z-test stage is a programmable processing stage or a fixed function stage of said screen space section.

16. The graphics processing unit as recited in claim 14 further comprising a Z-test stage configured to process said pixels before said tile stage, wherein said Z-test stage is a programmable processing stage or a fixed function stage of said screen space section.

17. The graphics processing unit as recited in claim 14 further comprising a composite stage of said screen space.

* * * * *